United States Patent
Rottmann

(10) Patent No.: US 12,450,886 B2
(45) Date of Patent: Oct. 21, 2025

(54) DEVICE AND METHOD FOR USING DIFFERENCE SIGNALS FOR GENERATING LABELS IN TRAINING AND TESTING A CLASSIFIER

(71) Applicant: Robert Bosch GmbH, Stuttgart (DE)

(72) Inventor: Kay Rottmann, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 1176 days.

(21) Appl. No.: 17/338,433

(22) Filed: Jun. 3, 2021

(65) Prior Publication Data

US 2021/0390419 A1 Dec. 16, 2021

(30) Foreign Application Priority Data

Jun. 12, 2020 (EP) ..................... 20179632

(51) Int. Cl.
*G06V 10/776* (2022.01)
*G06N 3/045* (2023.01)
*G06N 3/088* (2023.01)

(52) U.S. Cl.
CPC ........... *G06V 10/776* (2022.01); *G06N 3/045* (2023.01); *G06N 3/088* (2013.01)

(58) Field of Classification Search
None
See application file for complete search history.

(56) References Cited

U.S. PATENT DOCUMENTS

2020/0074707 A1 3/2020 Lee et al.

FOREIGN PATENT DOCUMENTS

JP 2020-87440 A 6/2020

OTHER PUBLICATIONS

Jaipuria et al., Deflating Dataset Bias Using Synthetic Data Augmentation, arXiv:2004. 13866v1 [cs.CV] Apr. 28, 2020; Total pp. 17 (Year: 2020).*
Gupta et al., Synthetic Data for Text Localisation in Natural Images, arXiv:1604.06646v1 [cs.CV] Apr. 22, 2016; Total pp. 14 (Year: 2016).*

(Continued)

*Primary Examiner* — Alan Chen
(74) *Attorney, Agent, or Firm* — Maginot, Moore & Beck LLP

(57) ABSTRACT

A computer-implemented method trainings a classifier. The classifier is configured to provide a classifier output signal characterizing a classification of a first input signal. The classifier is trained based on a training dataset. The method includes generating a training output signal with features of a second class based on a second input signal with features of a first class using a first generator, or generating a mask signal indicating which parts of the second input signal show the features of the first class using the first generator; and generating the training output signal or the mask signal based on the second input signal using the first generator. The method further includes generating a difference signal corresponding to the second input signal, the difference signal based on a difference between the second input signal and the training output signal, or the difference signal is the mask signal.

14 Claims, 10 Drawing Sheets

(56) References Cited

OTHER PUBLICATIONS

Liu et al., Synthetic Data Augmentation Using Multiscale Attention CycleGAN for Aircraft Detection in Remote Sensing Images, IEEE Geoscience and Remote Sensing Letters; vol. 19; Total pp. 9 (Year: 2021).*

Zhu et al., Unpaired Image-to-Image Translation using Cycle-Consistent Adversarial Networks, available at: https://arxiv.org/abs/1703.10593v1, Berkeley AI Research (BAIR) Laboratory, UC Berkeley, Mar. 30, 2017 (18 pages).

Ouyang et al., Pedestrian-Synthesis-GAN: Generating Pedestrian Data in Real Scene and Beyond, available at: https://github.com/yueruchen/Pedestrian-Synthesis-GAN, Apr. 14, 2018 (22 pages).

* cited by examiner

DEVICE AND METHOD FOR USING DIFFERENCE SIGNALS FOR GENERATING LABELS IN TRAINING AND TESTING A CLASSIFIER

This application claims priority under 35 U.S.C. § 119 to patent application no. EP 20179632.3, filed on Jun. 12, 2020 in Europe, the disclosure of which is incorporated herein by reference in its entirety.

The disclosure relates to a method for training a classifier, a method for assessing whether a classifier can be used in a control system or not, a method for operating an actuator, a computer program and a machine-readable storage medium, a classifier, a control system, and a training system.

BACKGROUND

"Unpaired Image-to-Image Translation using Cycle-Consistent Adversarial Networks", Jun-Yan Zhu, Taesung Park, Phillip Isola and Alexei A. Efros, discloses a method for unpaired image to image translation using cycle-consistent generative adversarial networks.

SUMMARY

Supervised training of classifiers requires a considerable amount of labeled data. Labeled data may be understood as plurality of data points wherein each data point is assigned a corresponding label which a classifier shall predict when provided the respective data point. For example, a signal depicting an urban traffic scene may be assigned "urban traffic" as class label.

It can be further envisioned, that the vehicles depicted in the scene are labeled with bounding boxes which the classifier shall predict.

Especially when using a classifier in a safety critical environment, e.g., for highly automated or autonomous vehicles, it is paramount to train the classifier with a vast amount of labeled data as in general the performance of the classifier is improved if it is presented with more (and diverse) data during training. It is paramount to achieve as high of a performance as possible as this mitigates the risk of misclassifying the classifier's environment during operation and subsequently improves the safety of the product using the classifier (e.g., the autonomous vehicle).

Likewise, assessing the performance of a classifier requires a vast amount of labeled data as test dataset. As the true performance of a classifier on data unseen during training, i.e., data the classifier will be confronted with during operation, is approximated with a test dataset, the larger and more diverse the test dataset the better the approximation of the true performance of the classifier during operation.

Manually obtaining labeled data is a cumbersome and time consuming job. Therefore, a method is desirable with allows for a reliable automatic labeling of signals which can then be used for training or testing a classifier.

The advantage of the method with the features disclosed herein is that it allows for obtaining labels for signals in an automatic and unsupervised fashion, i.e., without the need of human supervision. In turn, the method enables generating highly diverse and large datasets which can be used as either training datasets for enhancing the performance of a classifier or as test datasets to more reliably approximate the performance of a classifier.

In a first aspect, the disclosure is concerned with a computer-implemented method for training a classifier, wherein the classifier is configured to provide an output signal characterizing a classification of an input signal and training the classifier is based on a provided training dataset, wherein providing the training dataset comprises the following steps:

Providing a first generator, wherein the first generator is configured to provide an output signal with features of a second class based on a provided input signal with features of a first class or wherein the generator is configured to provide a mask signal, wherein the mask signal indicates which parts of the input signal show features of the first class;

Providing an output signal or a mask signal by the first generator based on an input signal;

Providing a difference signal, which corresponds to the input signal, wherein the difference signal is provided based on a difference between the input signal and the output signal or wherein the mask signal is provided as the difference signal;

Providing a desired output signal corresponding to the input signal based on the corresponding difference signal, wherein the desired output signal characterizes a desired classification of the input signal;

Providing at least one input signal and corresponding desired output signal as training dataset.

The classifier may obtain the output signal by feeding the signal to a machine-learning model, especially a convolutional neural network. The machine-learning model may then provide an intermediate output signal which can be provided as output signal of the classifier. In addition, the classifier may adapt the input signal before feeding it into the machine-learning model, e.g., extracting features from the input signal. Additionally, the classifier may also post-process the intermediate output signal and then provide it as output signal.

The classification characterized by the output signal may assign one or multiple class labels to the signal. Alternatively or additionally, it can be envisioned that the output signal characterizes a classification in the form of an object detection. Alternatively or additionally, it can be envisioned that the output signal characterizes a semantic segmentation of the signal.

The classifier may accept signals of various modalities, especially images such as, e.g., video images, RADAR images, LIDAR images and/or ultrasonic images as well as thermal camera images. Additionally, it can be envisioned that a signal comprises data from multiple and/or different sensor modalities, e.g., a combination of video, RADAR and LIDAR images.

Alternatively or additionally, a signal may comprise audio data, e.g., raw or preprocessed data from a microphone. For example, a signal may comprise a sequence of MFCC features of an audio recording.

Based on the content comprised in a signal, the signal may be assigned at least one class from a plurality of classes. In this sense, a signal with features of a class may be understood as a signal comprising characteristics that are crucial for the class. For example, if an image contains a red octagonal sign with the word "stop" on it, the image may be understood as containing features of the class "stop sign". In another example, the signal may be an audio sequence that contains spoken words of a first speaker, wherein the parts of the sequence containing the spoken words may be seen as features of the class "first speaker".

A signal may be organized in a predefined form. For example, a signal may be organized as a matrix, e.g., if the image is a gray-scale camera image, or a tensor, e.g., if the image is an RGB camera image. A signal may thus be understood, to have a size which characterizes the structure of the form it is organized in. For example, a image signal may have a width and a height. Additionally, the size of the image signal may comprise a certain depth indicating the length of each pixel, i.e., each pixel may be a number or vector of a predefined length. For example, RGB images have a depth of three, namely one channel for red, green and blue, and each pixel is a three-dimensional vector. In another example, gray-scale images comprise scalars as pixels.

Audio signals may also be organized as matrices or tensors. For example, a sequence of MFCC features may be organized as a matrix. In this case, the matrix' rows may contain the MFCC features and each row may represent a certain point in time of the recording of the audio signal.

Organizing signals in a predefined form allows for computing certain operations with respect to the signals. For example, if signals are organized as matrices or tensors, determining the difference between two signals may be achieved by a matrix-matrix subtraction or a tensor-tensor subtraction respectively.

Signals may comprise distinct sub-elements. For example, for image signals the pixels may be viewed as sub-elements. For audio signals, the individual time steps may be viewed as sub-elements. Sub-elements may be of a vectorial form, e.g., pixels of an RGB image or features of an audio sequence such as MFCC features. Sub-elements may have a distinct position. For example, have a certain row and column position in an image and features of an audio sequence have a distinct position in the sequence.

The position of two sub-elements from different signals may be equal. It may hence be possible to reference a first sub-element of a first signal using the position of a sub-element of a second signal. For example, considering two single-channel images of 100 by 100 pixels, there exists a pixel with at the position (10, 12) in both signals, wherein the number 10 indicates the row index of the pixel and the number 12 indicates the height index of the pixel.

The generator may be viewed as a device for providing an output signal given an input signal. Preferably, the generator is part of a generative adversarial network.

If the difference signal is obtained from the input signal and the output signal, the difference signal may either be obtained by subtracting the input signal from the output signal or the output signal from the input signal.

In another aspect of the disclosure, it can be further envisioned that providing the first generator comprises training a CycleGAN, wherein the CycleGAN comprises a second generator and a third generator, wherein training the CycleGAN comprises training the second generator to provide an output signal with features of the second class based on a provided input signal with features of the first class and training the third generator to provide an input signal with features of the first class based on a provided output signal with features of the second class, and providing the second generator as first generator after training of the CycleGAN.

A cycle-consistent generative adversarial network (CycleGAN) is a machine learning model which allows for transforming signals with features of a first class into features of a second class. For this, the CycleGAN may be trained with signals containing features of either of two classes. Training the CycleGAN this way is achieved by using two generative adversarial networks (GANs). The first GAN is trained to provide a signal with features of the second class based on a signal with features of the first class while the second GAN is trained to provide a signal with features of the first class based on a signal with features of the second class. Each GAN comprises a generator and a discriminator, wherein the generator generates a respective signal and the discriminator assesses whether the signal looks realistic with respect to the desired output. For example, if a GAN is trained to transform signals with stop signs into signals with a speed limit sign, the generator first provides a signal with a speed limit sign based on a signal with a stop sign and the discriminator then determines how realistic the signal with the speed limit sign is with respect to other signals with a speed limit sign.

Compared to a normal GAN, the CycleGAN imposes an additional constraint during training. If a second signal provided from the first GAN based on a first signal is provided to the second GAN, a third signal provided by the second GAN has to look as close to the first signal as possible. Here, the third signal may be understood as looking as close as possible to the first signal, if the respective sub-element values of the first signal and third signal are as close as possible.

The generator part of the first GAN may be understood as the second generator while the generator part of the second GAN may be understood as the third generator.

The advantage of providing the first generator based on a CycleGAN is that the first generator is able to accurately obtain signals with features of the second class as CycleGANs are currently the best performing models for unpaired signal to signal translation, i.e., training of the CycleGAN and in turn the first generator does not require to match signals with features of the first class to signals with features of the second class. This allows for collecting vast amount of data from either of the two classes without the constraint for the individual data points to show similar content of the other class. This allows for training the generator with more data and hence improves its performance, i.e., its accuracy when providing signals.

In another aspect of the disclosure, it can be further envisioned that providing an output signal with features of the second class based on a provided input signal with features of a first class by the first or second generator comprises the steps of:

Determining an intermediate signal and a mask signal based on the input signal;

Determining the Hadamard product between the mask signal and the intermediate output signal and providing the determined Hadamard product as a first result signal;

Determining the Hadamard product between an inverse of the mask signal with the input signal and providing the determined Hadamard product as a second result signal;

Providing the sum of the first result signal and the second result signal as output signal.

It can further be envisioned that during training of the second generator, the generator is trained by optimizing a loss function and that the sum of absolute values of the sub-elements of the mask signal is added to the loss function.

Preferably, the mask signal and/or the intermediate signal are of the same height and width as the input signal. Alternatively, the mask signal and/or intermediate signal may be scaled to be of the same size as the input signal. Multiplying the mask signal with the intermediate signal may be understood as a sub-element-wise multiplication, i.e., a first sub-element at a position in the first result signal can be obtained by multiplying a mask sub-element at the position in the mask signal with an intermediate sub-element at the position in the intermediate signal. A second sub-element in the second result signal can be obtained mutatis mutandi.

The inverse of the mask signal may be obtained by subtracting the mask signal from a signal of the same shape as the mask signal, wherein the sub-elements of the signal are the unit vector.

It can be envisioned that the mask signal is of depth one in which case determining the individual Hadamard products can be achieved by first stacking copies of the mask signal along the depth dimension to form a new mask signal which matches the depth of the input signal and then computing the Hadamard products using the new mask signal as mask signal.

It can also be envisioned that mask signal is made up of scalar sub-elements in the range from 0 to 1. This way, the masking operation can be viewed as blending the intermediate signal over the input signal in order to provide the output signal.

The advantage of providing a mask signal by the second generator is that the mask signals allows for changing only small areas of the input signal in order to obtain the output signal. This characteristic is enhanced even further by adding the sum of the absolute values in the mask signal to the loss function during training. This incentivizes the generator to provide as few as possible non-zero values in the mask signal. This has the effect that the input signal is changed only in areas that contain distinct features of the first class that need to be changed in order to provide an output signal with features of the second class. In turn, this allows for more accurately finding the distinct features of the first class and hence improves the accuracy of the desired output signal.

In another aspect of the disclosure, it can be further envisioned that providing the desired output signal comprises determining a norm value for a sub-element of the difference signal, wherein the norm value corresponds to the sub-element, and comparing the norm value with a predefined threshold value.

The norm value of a sub-element may be determined by computing an $L_p$-norm of the sub-element, such as the Euclidean norm, Manhattan norm or infinity norm.

The advantage of this approach is that difference signals with a depth larger than 1 may still be compared with a predefined threshold in order to determine where the distinct features of a class are located in the input signal. This allows for employing the proposed method for input signals with depth larger than 1.

In another aspect of the disclosure, it can be further envisioned that the output signal comprises at least one bounding box, wherein the bounding box is provided by determining a region in the difference signal comprising a plurality of sub-elements, wherein the plurality of sub-elements comprises sub-elements whose corresponding norm values do not fall below the threshold value, and providing the region as the bounding box.

The region is preferably a rectangular region, wherein each edge of the rectangular region is parallel to one of the edges of the difference signal. Preferably, the region extends just so far to include the sub-elements from the plurality of sub-elements. Alternatively, it can also be envisioned to have the region extend a predefined amount of sub-elements around the plurality of sub-elements, i.e., the bounding box is padded. It can be further envisioned that the predefined amount is also dependent on the amount of sub-elements in the plurality. For example, the predefined amount may be determined by multiplying the amount of sub-elements in the plurality with a constant value.

It can be envisioned that multiple regions from the signal are returned as bounding boxes. The multiple regions may, for example, be determined by a connected-components analysis of the difference signal, wherein sub-elements of the difference signal are considered for a connected component if and only if their corresponding norm value does not fall below the threshold value.

The advantage of this approach is that bounding boxes are generated automatically with no human supervision, which can in turn be used as labels for training the classifier to classify objects in a signal. Due to not requiring human supervision, this process can be applied to a large amount of signals which can then be used to train the classifier. This enables the classifier to learn information from more signals and in turn enables it to achieve a higher classification performance.

In another aspect of the disclosure, it can be further envisioned that the desired output signal comprises a semantic segmentation signal of the input signal, wherein providing the semantic segmentation signal comprises the steps of:

Providing a signal of the same height and width as the difference signal;

Determining the norm value of a sub-element in the difference signal, wherein the sub-element has a position in the difference signal;

Setting a sub-element at the position in the signal to belong to the first class if the norm value falls below a predefined threshold and setting the sub-element to a background class otherwise;

Providing the signal as semantic segmentation signal.

Setting the sub-element in the signal to a class may be understood as setting the value of the sub-element such that it characterizes a membership of the sub-element to a specific class. For example, the signal may be of depth 1 and if the norm value falls below the threshold value, the sub-element may be assigned the value 0 to indicate membership to the first class and 1 otherwise.

The approach may be understood as determining which sub-elements need to be changed to transform the signal from having features of a first class to having features of a second class. The determined sub-elements do thus contain features of the first class in the first signal. All other sub-elements may be considered as background class, i.e., not containing relevant features.

The advantage of this approach is that semantic segmentation signals are determined automatically with no human supervision, which can in turn be used as labels for training the classifier to perform semantic segmentation of signals. Due to not requiring human supervision, this process can be applied to a large amount of signals in a short amount of time. The signals can then be used to train the classifier. This enables the classifier to learn information form more labeled signals than could be determined by a human in the same amount of time and in turn enables it to achieve a higher classification performance.

In another aspect, the disclosure is concerned with a computer-implemented method for determining whether a classifier can be used in a control system or not, wherein the classifier can be used in the control system if and only if its classification performance on a test dataset indicates an acceptable accuracy with respect to a threshold, wherein providing the test dataset comprises the steps of:

Providing a first generator, wherein the first generator is configured to provide an output signal with features of a second class based on a provided input signal with features of a first class or wherein the generator is configured to provide a mask signal, wherein the mask signal indicates which parts of the input signal show features of the first class;

Providing an output signal or a mask signal by the first generator based on an input signal;

Providing a difference signal, which corresponds to the input signal, wherein the difference signal is provided based on a difference between the input signal and the output signal or wherein the mask signal is provided as difference signal;

Providing a desired output signal corresponding to the input signal based on the corresponding difference signal, wherein the desired output signal characterizes a desired classification which shall be provided by the classifier when provided the input signal;

Providing at least one input signal and corresponding desired output signal as test dataset.

The method for generating the test dataset is identical to the method for generating the training dataset described in the first aspect of the disclosure.

Depending on the task of the classifier, classification performance may be measured in accuracy for single-label signal classification, (mean) Average Precision for object detection or (mean) Intersection over Union for semantic segmentation. It can also be envisioned that negative log likelihood is used as classification performance metric.

The advantage of this aspect of the disclosure is that the proposed approach allows for gaining insights into the inner workings of the classifier. It may serve as means to determine situations, in which the classification performance is not adequate for the classifier to be used in a product. For example, the proposed approach may be used as part of determining whether a classifier used in an at least partially autonomous vehicle for detecting pedestrians has a high enough classification performance to be safely used as part of the at least partially autonomous vehicle.

It can be envisioned that the method for testing the classifier is repeated iteratively. In each iteration, the classifier is tested on the test dataset to determine the classification performance. If the performance is not adequate for the classifier to be used in the product, the classifier may be enhanced by, e.g., training it on new training data, preferably generated through a method according to the first aspect of this disclosure. This process can be repeated until the classifier achieves an adequate performance on the test dataset. Alternatively, it can be envisioned, that a new test dataset is determined in each iteration.

BRIEF DESCRIPTION OF THE DRAWINGS

Embodiments of the disclosure will be discussed with reference to the following figures in more detail. The figures show.

DETAILED DESCRIPTION

Figure 1:
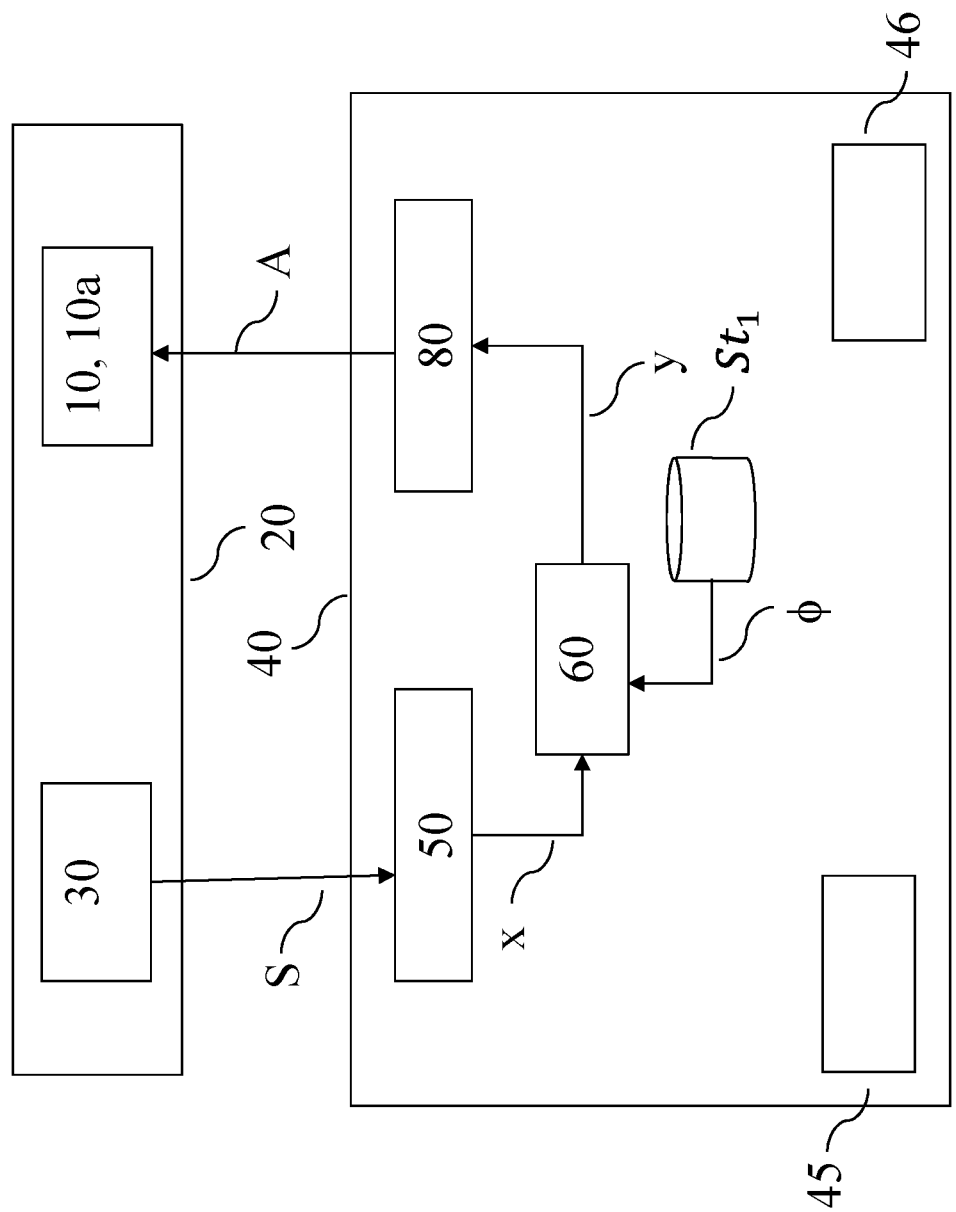
FIG. 1 a control system comprising a classifier controlling an actuator in its environment.

Shown in FIG. 1 is an embodiment of an actuator (10) in its environment (20). The actuator (10) interacts with a control system (40). The actuator (10) and its environment (20) will be jointly called actuator system. At preferably evenly spaced points in time, a sensor (30) senses a condition of the actuator system. The sensor (30) may comprise several sensors. Preferably, the sensor (30) is an optical sensor that takes images of the environment (20). An output signal (S) of the sensor (30) (or, in case the sensor (30) comprises a plurality of sensors, an output signal (S) for each of the sensors) which encodes the sensed condition is transmitted to the control system (40).

Thereby, the control system (40) receives a stream of sensor signals (S). It then computes a series of actuator control commands (A) depending on the stream of sensor signals (S), which are then transmitted to the actuator (10).

The control system (40) receives the stream of sensor signals (S) of the sensor (30) in an optional receiving unit (50). The receiving unit (50) transforms the sensor signals (S) into input images (x). Alternatively, in case of no receiving unit (50), each sensor signal (S) may directly be taken as an input image (x). The input image (x) may, for example, be given as an excerpt from the sensor signal (S). Alternatively, the sensor signal (S) may be processed to yield the input image (x). The input image (x) comprises image data corresponding to a signal recorded by the sensor (30). In other words, the input image (x) is provided in accordance with the sensor signal (S).

The input image (x) is then passed on to a classifier (60).

The classifier (60) is parametrized by parameters (which are stored in and provided by a parameter storage ($St_1$).

The classifier (60) determines an output signal (y) from the input images (x). The output signal (y) comprises information that assigns one or more labels to the input image (x). The output signal (y) is transmitted to an optional conversion unit (80), which converts the output signal (y) into the control commands (A). The actuator control commands (A) are then transmitted to the actuator (10) for controlling the actuator (10) accordingly. Alternatively, the output signal (y) may directly be taken as actuator control commands (A).

The actuator (10) receives actuator control commands (A), is controlled accordingly and carries out an action corresponding to the actuator control commands (A). The actuator (10) may comprise a control logic which transforms an actuator control command (A) into a further control command, which is then used to control actuator (10).

In further embodiments, the control system (40) may comprise a sensor (30). In even further embodiments, the control system (40) alternatively or additionally may comprise an actuator (10).

In one embodiment, the classifier (60) may be designed to identify lanes on a road ahead, e.g., by classifying a surface of the road and/or markings on the road and identifying lanes as patches of road surface between the markings. Based on an output of a navigation system, a suitable lane for pursuing a chosen path can then be selected, and depending on a present lane and the target lane, it may then be decided whether a vehicle (100) is to switch lanes or stay in the present lane. The actuator control command (A) may then be computed by, e.g., retrieving a predefined motion pattern from a database corresponding to the identified action.

Alternatively or additionally, the classifier (60) may be configured to detect road signs and/or traffic lights. Upon identifying a road sign or a traffic light, depending on an identified type of the road sign or an identified state of the traffic light, corresponding constraints on possible motion patterns of the vehicle (100) may then be retrieved from, e.g., a database, a trajectory of the vehicle (100) may be computed in accordance with the constraints, and the actuator control command (A) may be computed to steer the vehicle (100) such as to navigate along the trajectory.

Alternatively or additionally, the classifier (60) may be configured to detect pedestrians and/or vehicles. Upon identifying pedestrians and/or vehicles, a projected future behavior of the pedestrians and/or vehicles may be estimated, and based on the estimated future behavior, a trajectory may then be selected such as to avoid collision with the identified pedestrians and/or vehicles, and the actuator control command (A) may be computed to steer the vehicle (100) such as to navigate along the trajectory.

In still further embodiments, it can be envisioned that the control system (40) controls a display (10a) instead of or in addition to the actuator (10).

Furthermore, the control system (40) may comprise a processor (45) (or a plurality of processors) and at least one machine-readable storage medium (46) on which instructions are stored which, if carried out, cause the control system (40) to carry out a method according to one aspect of the disclosure.

Figure 2:
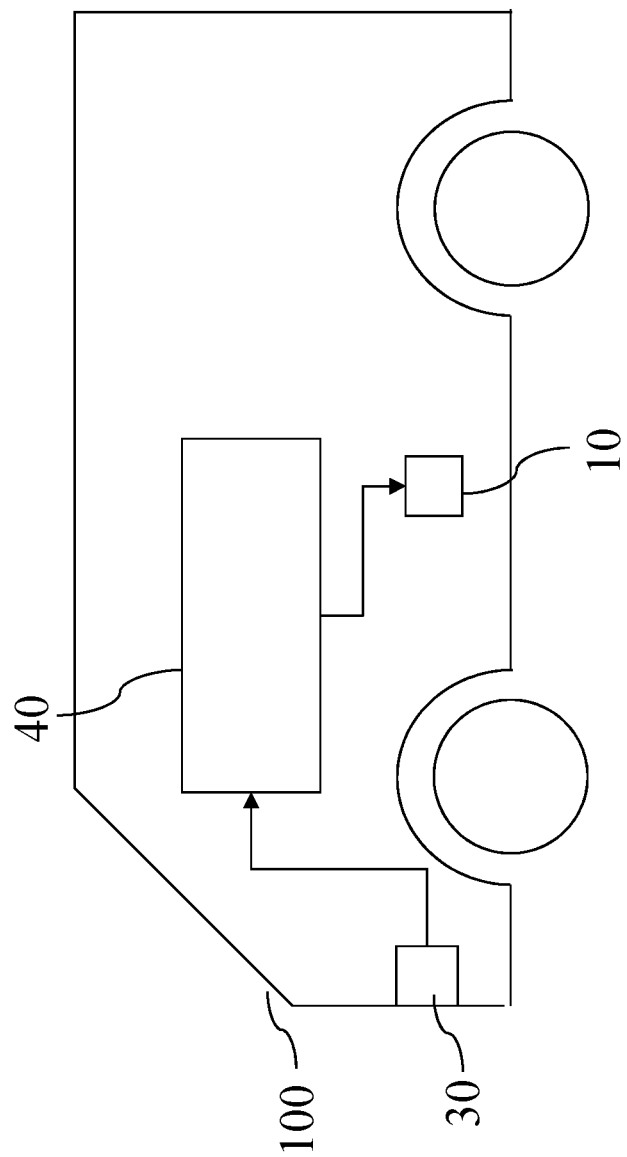
FIG. 2 the control system controlling an at least partially autonomous robot.

FIG. 2 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors and or one or more position sensors (like e.g. GPS). Some or all of these sensors are preferably but not necessarily integrated in the vehicle (100).

Alternatively or additionally, the sensor (30) may comprise an information system for determining a state of the actuator system. One example for such an information system is a weather information system which determines a present or future state of the weather in the environment (20).

For example, using the input image (x), the classifier (60) may detect objects in the vicinity of the at least partially autonomous robot. The output signal (y) may comprise an information, which characterizes where objects are located in the vicinity of the at least partially autonomous robot. The actuator control command (A) may then be determined in accordance with this information, for example to avoid collisions with the detected objects.

The actuator (10), which is preferably integrated in the vehicle (100), may be given by a brake, a propulsion system, an engine, a drivetrain, or a steering of the vehicle 100. Actuator control commands (A) may be determined such that the actuator (or actuators) (10) is/are controlled such that vehicle (100) avoids collisions with the detected objects. The detected objects may also be classified according to what the classifier (60) deems them most likely to be, e.g., pedestrians or trees, and the actuator control commands (A) may be determined depending on the classification.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, the actuator command control (A) may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses the sensor (30), preferably an optical sensor, to determine a state of plants in the environment (20). The actuator (10) may control a nozzle for spraying liquids and/or a cutting device, e.g., a blade. Depending on an identified species and/or an identified state of the plants, an actuator control command (A) may be determined to cause the actuator (10) to spray the plants with a suitable quantity of suitable liquids and/or cut the plants.

In even further embodiments, the at least partially autonomous robot may be given by a domestic appliance (not shown), like e.g. a washing machine, a stove, an oven, a microwave, or a dishwasher. The sensor (30), e.g., an optical sensor, may detect a state of an object which is to undergo processing by the household appliance. For example, in the case of the domestic appliance being a washing machine, the sensor (30) may detect a state of the laundry inside the washing machine. The actuator control command (A) may then be determined depending on a detected material of the laundry.

Figure 3:
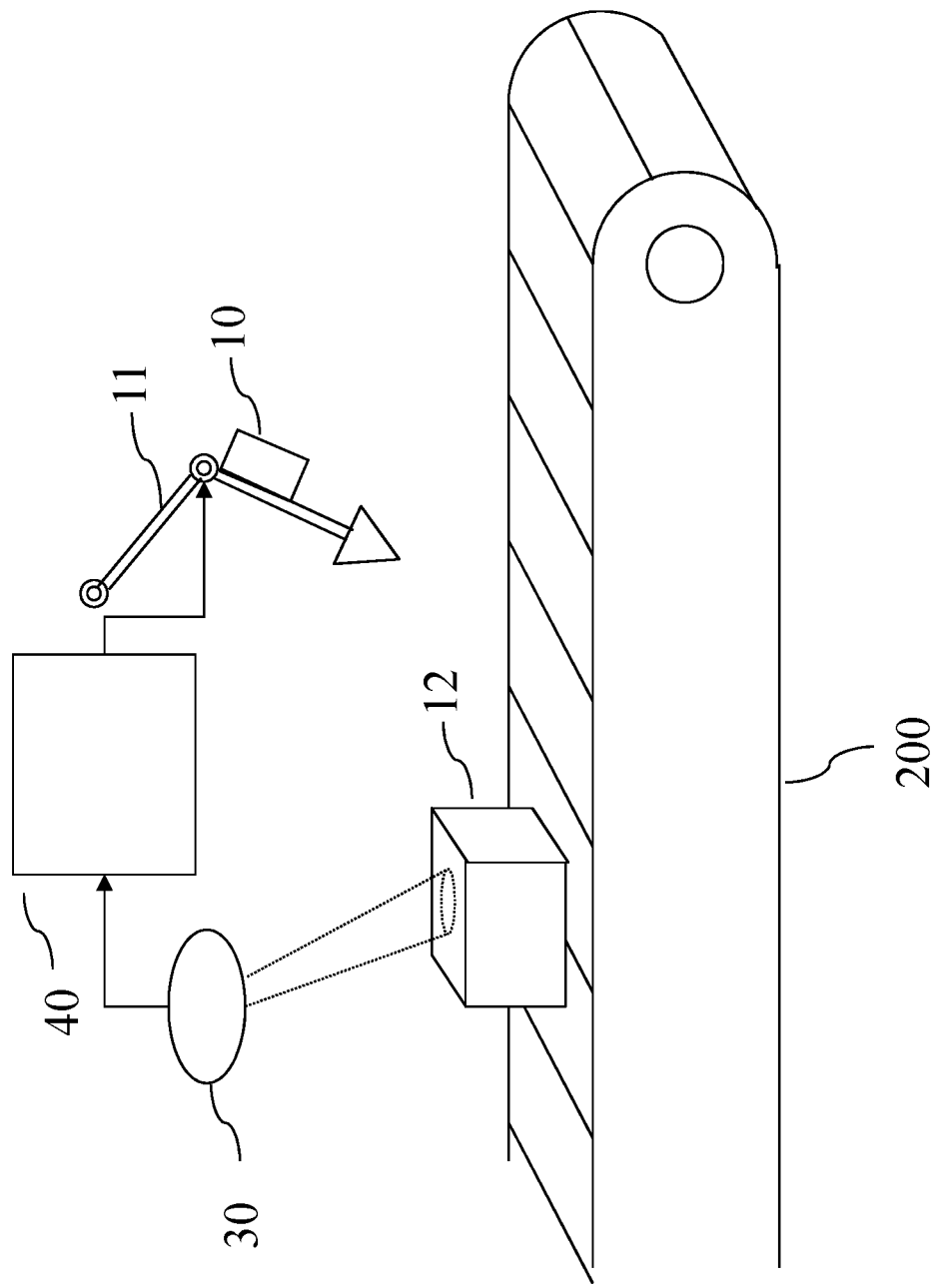
FIG. 3 the control system controlling a manufacturing machine.

Shown in FIG. 3 is an embodiment in which the control system (40) is used to control a manufacturing machine (11), e.g., a punch cutter, a cutter or a gun drill, of a manufacturing system (200), e.g., as part of a production line. The control system (40) controls an actuator (10), which in turn controls the manufacturing machine (11).

The sensor (30) may be given by an optical sensor which captures properties of, e.g., a manufactured product (12). The classifier (60) may determine a state of the manufactured product (12) from these captured properties. The actuator (10) which controls the manufacturing machine (11) may then be controlled depending on the determined state of the manufactured product (12) for a subsequent manufacturing step of the manufactured product (12). Alternatively, it may be envisioned that the actuator (10) is controlled during manufacturing of a subsequently manufactured product (12) depending on the determined state of the manufactured product (12).

Figure 4:
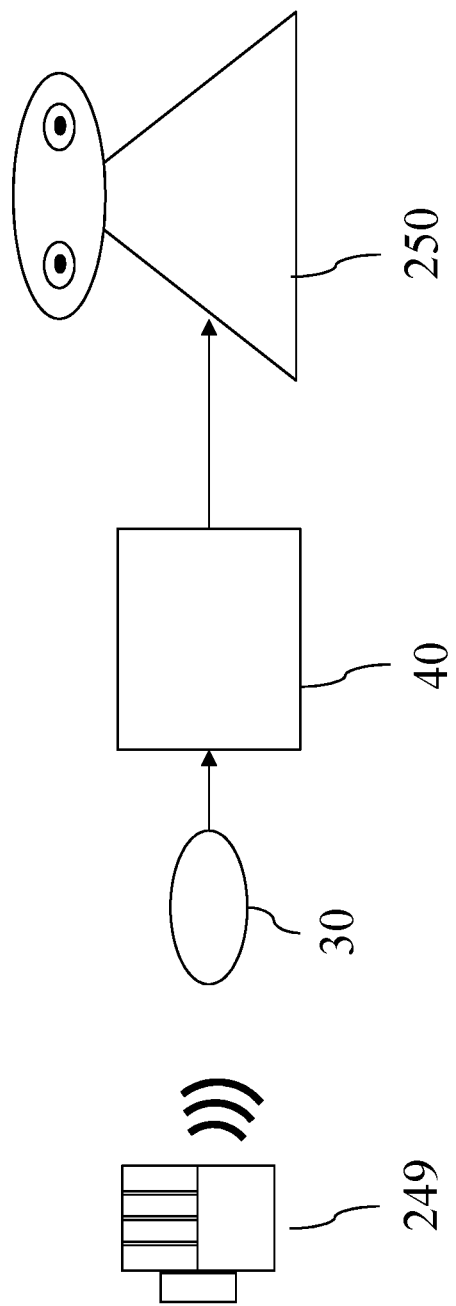
FIG. 4 the control system controlling an automated personal assistant.

Shown in FIG. 4 is an embodiment in which the control system (40) is used for controlling an automated personal assistant (250). The sensor (30) may be an optic sensor, e.g., for receiving video images of a gestures of a user (249). Alternatively, the sensor (30) may also be an audio sensor, e.g., for receiving a voice command of the user (249).

The control system (40) then determines actuator control commands (A) for controlling the automated personal assistant (250). The actuator control commands (A) are determined in accordance with the sensor signal (S) of the sensor (30). The sensor signal (S) is transmitted to the control system (40). For example, the classifier (60) may be configured to, e.g., carry out a gesture recognition algorithm to identify a gesture made by the user (249). The control system (40) may then determine an actuator control command (A) for transmission to the automated personal assistant (250). It then transmits the actuator control command (A) to the automated personal assistant (250).

For example, the actuator control command (A) may be determined in accordance with the identified user gesture recognized by the classifier (60). It may comprise information that causes the automated personal assistant (250) to retrieve information from a database and output this retrieved information in a form suitable for reception by the user (249).

In further embodiments, it may be envisioned that instead of the automated personal assistant (250), the control system (40) controls a domestic appliance (not shown) controlled in accordance with the identified user gesture. The domestic appliance may be a washing machine, a stove, an oven, a microwave or a dishwasher.

Figure 5:
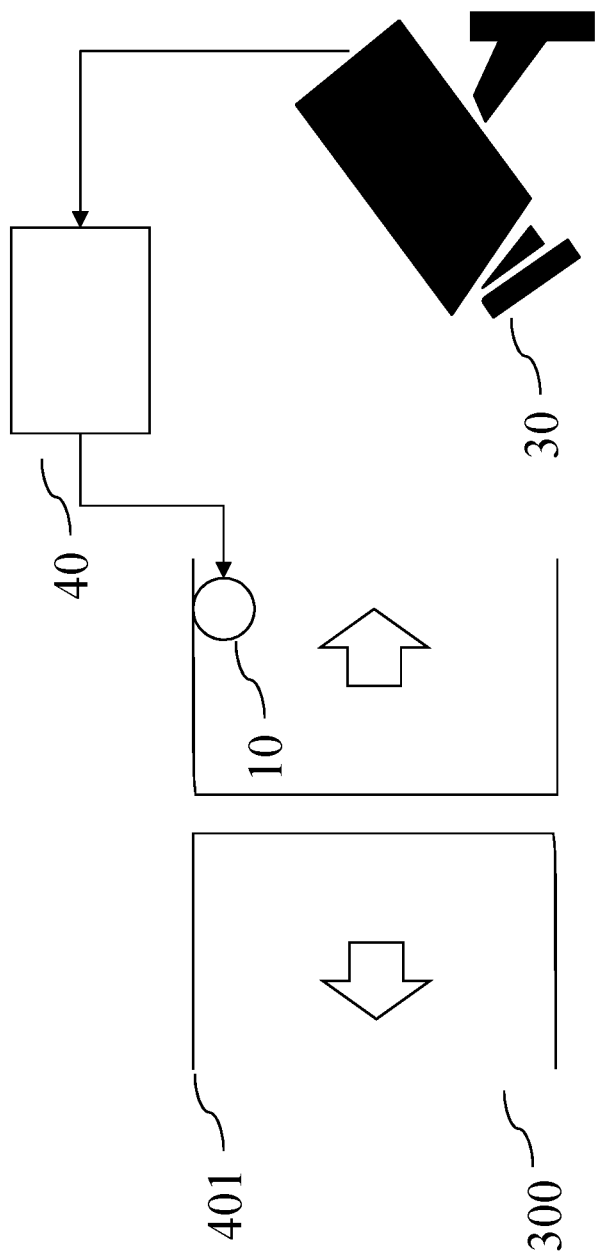
FIG. 5 the control system controlling an access control system.

Shown in FIG. 5 is an embodiment in which the control system (40) controls an access control system (300). The access control system (300) may be designed to physically control access. It may, for example, comprise a door (401). The sensor (30) can be configured to detect a scene that is relevant for deciding whether access is to be granted or not. It may, for example, be an optical sensor for providing image or video data, e.g., for detecting a person's face. The classifier (60) may be configured to interpret this image or video data, e.g., by matching identities with known people stored in a database, thereby determining an identity of the person. The actuator control signal (A) may then be determined depending on the interpretation of classifier (60), e.g., in accordance with the determined identity. The actuator (10) may be a lock which opens or closes the door depending on the actuator control signal (A). A non-physical, logical access control is also possible.

Figure 6:
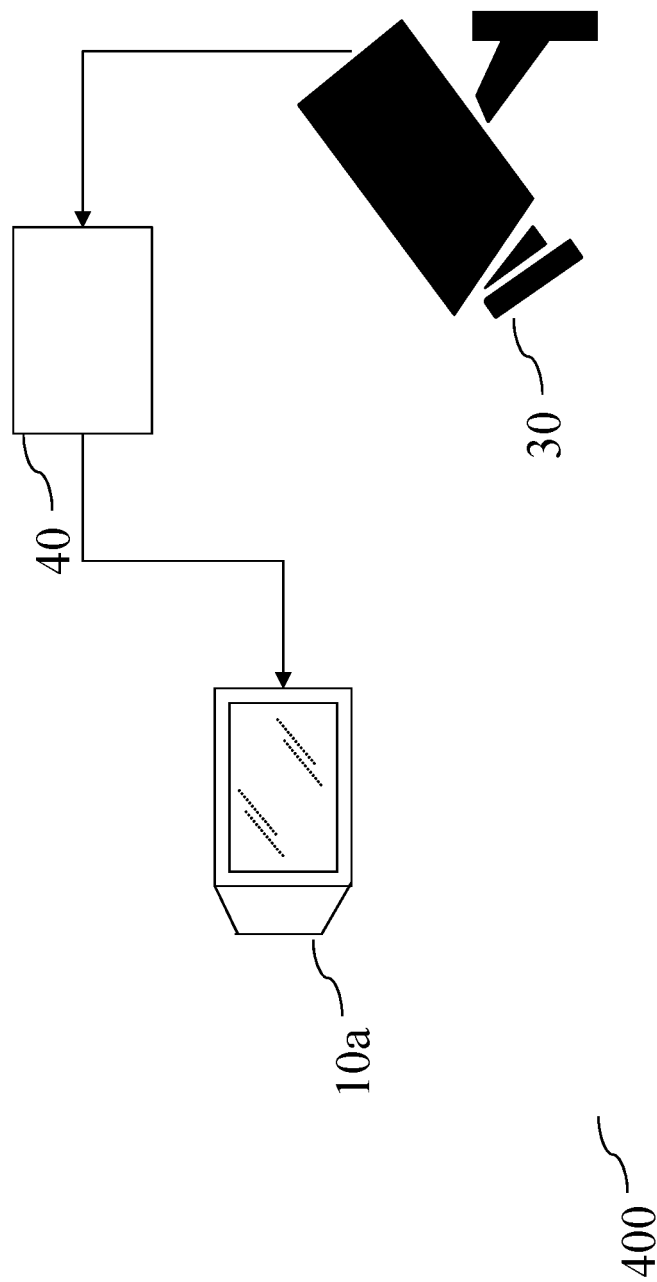
FIG. 6 the control system controlling a surveillance system.

Shown in FIG. 6 is an embodiment in which the control system (40) controls a surveillance system (400). This embodiment is largely identical to the embodiment shown in FIG. 5. Therefore, only the differing aspects will be described in detail. The sensor (30) is configured to detect a scene that is under surveillance. The control system (40) does not necessarily control an actuator (10), but may alternatively control a display (10a). For example, the classifier (60) may determine a classification of a scene, e.g., whether the scene detected by an optical sensor (30) is suspicious. The actuator control signal (A), which is transmitted to the display (10a), may then, for example, be configured to cause the display (10a) to adjust the displayed content dependent on the determined classification, e.g., to highlight an object that is deemed suspicious by the classifier (60).

Figure 7:
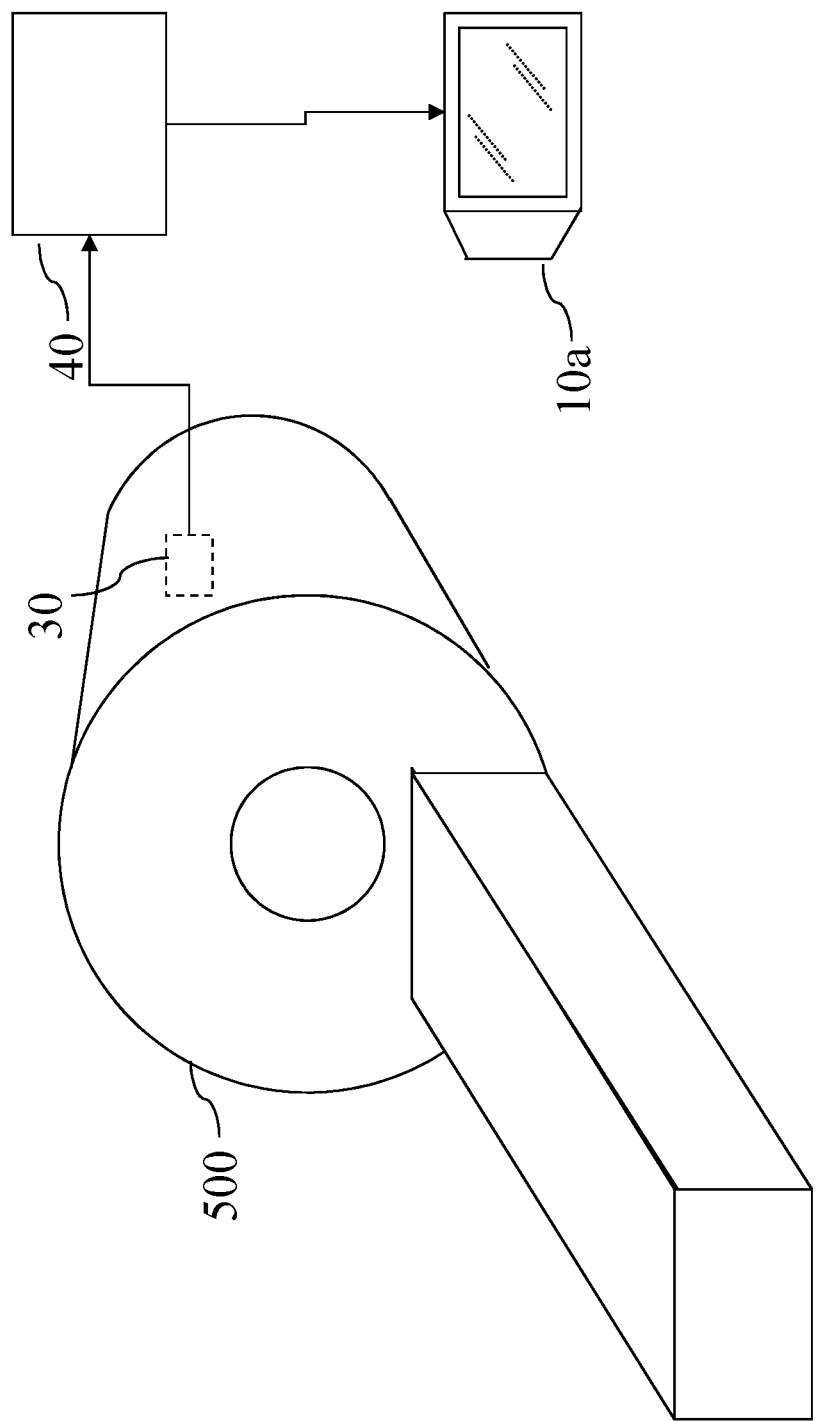
FIG. 7 the control system controlling an imaging system.

Shown in FIG. 7 is an embodiment of a control system (40) for controlling an imaging system (500), for example an Mill apparatus, x-ray imaging apparatus or ultrasonic imaging apparatus. The sensor (30) may, for example, be an imaging sensor. The classifier (60) may then determine a classification of all or part of the sensed image. The actuator control signal (A) may then be chosen in accordance with this classification, thereby controlling a display (10a). For example, the classifier (60) may interpret a region of the sensed image to be potentially anomalous. In this case, the actuator control signal (A) may be determined to cause the display (10a) to display the image and highlighting the potentially anomalous region.

Figure 8:
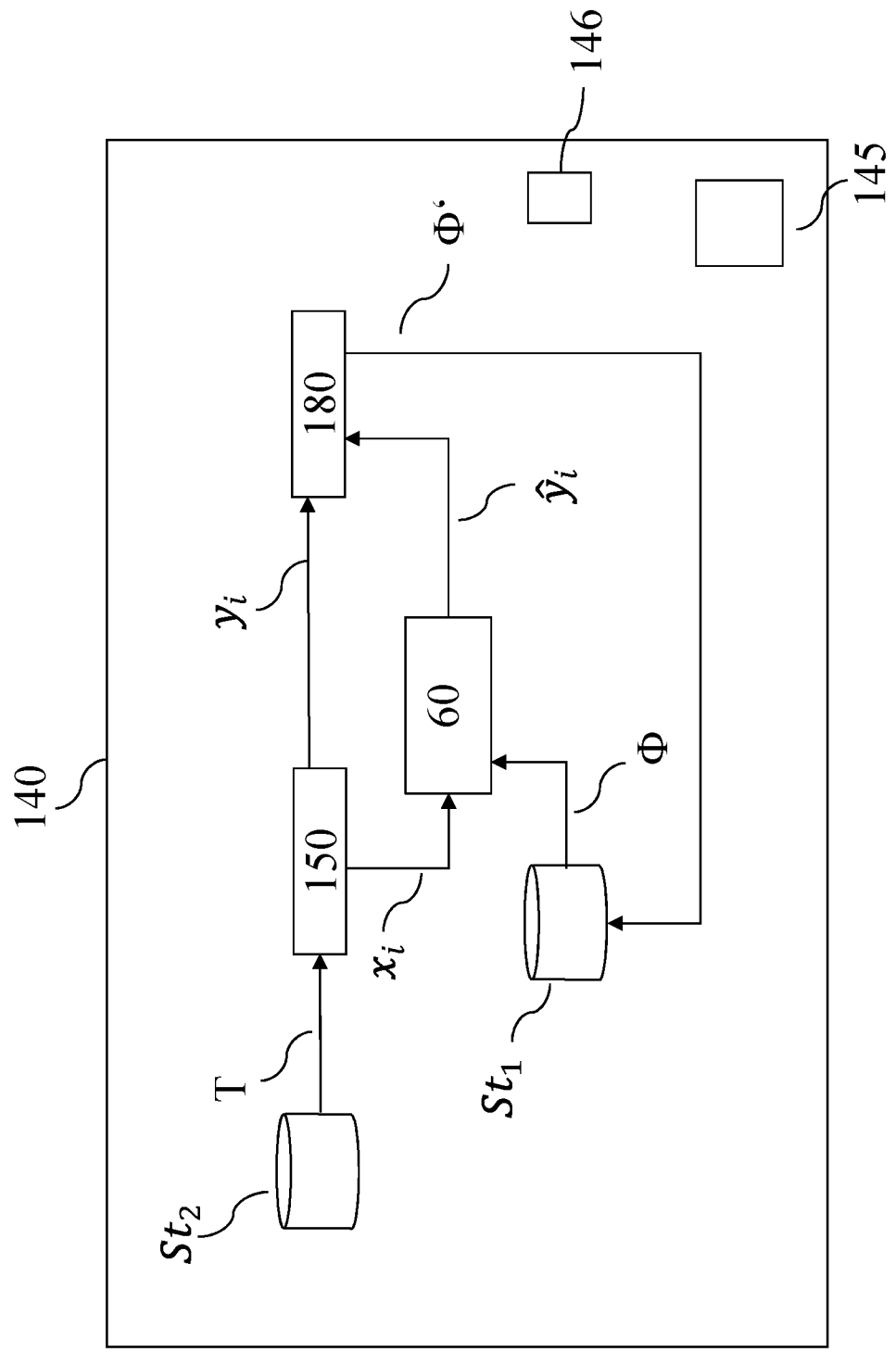
FIG. 8 a training system for training the classifier.

Shown in FIG. 8 is an embodiment of a training system (140) for carrying out training of the classifier (60). For this, a training data unit (150) accesses a computer-implemented training database ($St_2$) in which at least one set (T) of training data is stored. The set (T) comprises pairs of images and corresponding desired output signals.

The training data unit (150) then provides a batch of images ($x_i$) to the classifier (60). The batch of images ($x_i$) may contain one or multiple images from the set (T). The classifier (60) then determines a batch of output signals ($ŷ$) from the batch of images ($x_i$) by determining an output signal for each image in the batch. The batch of output signals ($ŷ$) is then passed to an update unit (180). Additionally, the training unit (150) passes a batch of corresponding desired output signals ($y_i$) to the update unit, wherein the batch of corresponding desired output signals ($y_i$) comprises the corresponding desired output signal for each image in the batch of images ($x_i$).

Based on the batch of output signals ($ŷ$) and the batch of desired output signals ($y_i$), the update unit then determines an updated set ($Φ'$) of parameters for the classifier (60) using, e.g., stochastic gradient descent. The updated set ($Φ'$) of parameters is then stored in the parameter storage ($St_1$).

In further embodiments, the training process is then repeated for a desired amount of iterations, wherein the updated set ($Φ'$) of parameters is provided as set ($Φ$) of parameters by the parameter storage ($St_1$) in each iteration.

Furthermore, the training system (140) may comprise a processor (145) (or a plurality of processors) and at least one machine-readable storage medium (146) on which instructions are stored, which, if carried out, cause the training system (140) to carry out the training method according an aspect of the disclosure.

Figure 9:
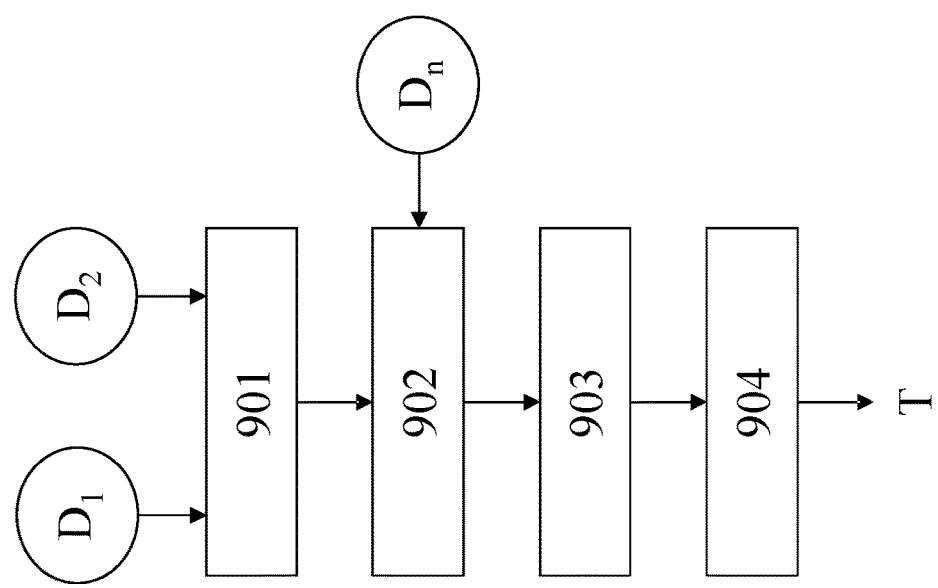
FIG. 9 a flow chart depicting a method for providing a dataset for training.

Shown in FIG. 9 is a flowchart depicting a method for determining the set (T) of images and desired output signals.

In a first step (901), the method provides a first generator. The first generator is provided by training a CycleGAN on images of a first dataset ($D_1$) with features of a first class and on images of a second dataset ($D_2$) with features of a second class. The CycleGAN is trained to transform images from the first dataset ($D_1$) to look like images from the second dataset ($D_2$). The generator of the CycleGAN responsible for transforming from the first dataset ($D_1$) to the second dataset ($D_2$) is then provided as first generator.

In a second step (902), images of a new dataset ($D_n$) are then provided to the generator. For each of the image, the generator provides an output image.

In a third step (903), a difference image is determined for each image of the new dataset ($D_n$) by subtracting the image from its corresponding output image and. In further embodiments, it can be envisioned that the difference image is determined by subtracting the output image from the image.

In a fourth step (904), a desired output signal is determined for each image based on the difference image corresponding to the image. For example, the desired output signal may comprise bounding boxes indicating the presence of certain objects in the image. These bounding boxes may be obtained by first computing a norm value for each pixel of the difference image. If the norm value does not fall below a predefined threshold value, the pixel can be viewed as containing data that changed substantially from image to output image. A connected-component analysis can then be conducted for pixels, whose norm does not fall below the threshold value, which may provide one or multiple sets of pixels that belong to the same component. Each of these components may be viewed as relevant objects and a bounding box may be determined for each of the components. A bounding box may be determined such that it encloses all pixels of a component while having minimal size, i.e., tightly fits around the pixels of the component. Alternatively, it can be imagined that the bounding box is chosen such that its edges have a predefined maximal distance to the pixels of the component. This approach may be seen as determining a padded bounding box around the pixels.

The bounding box does not necessarily need to be rectangular. It may have any form of convex or non-convex shape without the method to require any modifications.

The set (T) may then be provided as the images from the new dataset ($D_n$) as well as the bounding boxes corresponding to each of the images, i.e., the desired output signals.

In further embodiments it can be envisioned that instead of bounding boxes, semantic segmentation images are determined from the difference image. For this, all pixels of a signal, whose norm value does not fall below the threshold, can be labeled as belonging to the first class, while all other pixels of the image may be labeled as a background class. A signal with pixels labeled according to this procedure may then be provided as semantic segmentation image in the desired output signal.

Figure 10:
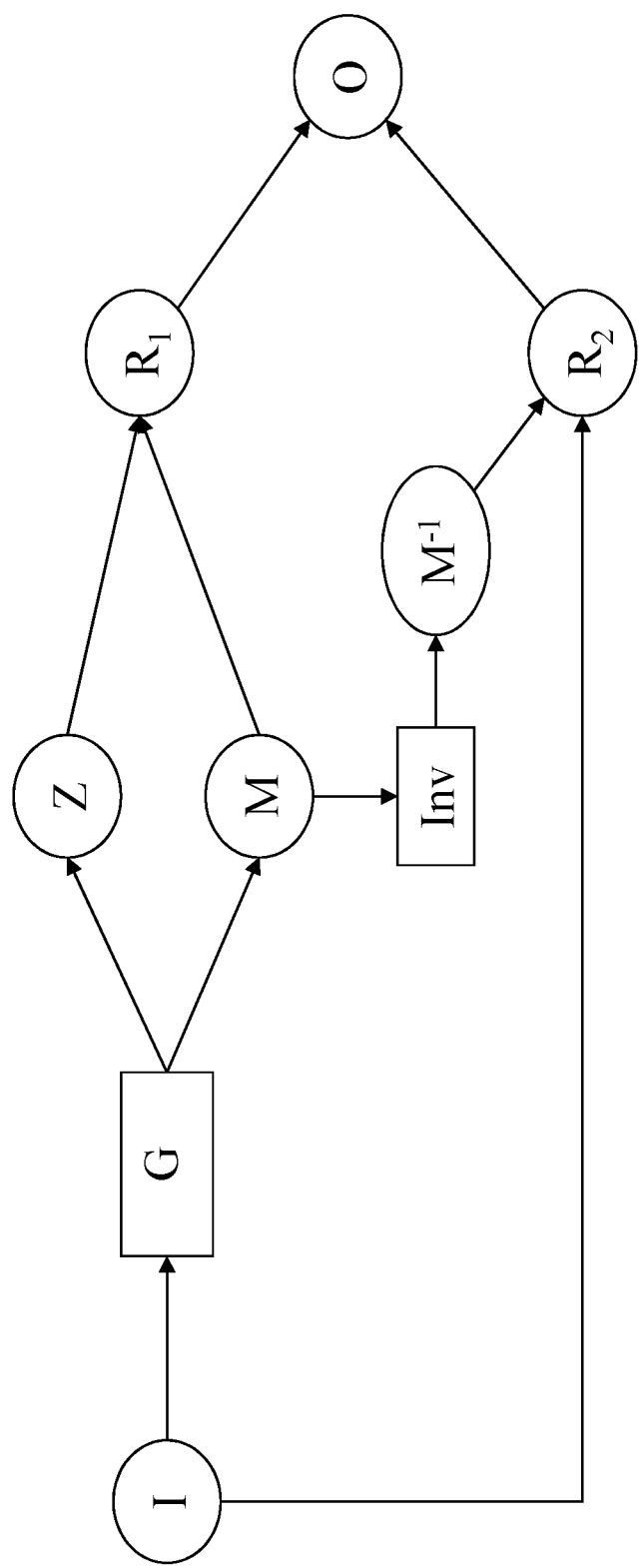
FIG. 10 a generator providing an output signal based on a mask signal.

In further embodiments, it can be envisioned that the generators used in the CycleGAN provides a mask image and that the mask image is used as difference image. FIG. 10 shows an embodiment of a generator (G) providing a mask image (M) to determine an output image (O). Based on an input image (I) the generator (G) provides a mask image (M) and an intermediate image (Z).

Preferably, the generator (G) is configured such that the provided mask image (M) only contains values in the range from 0 to 1. This can preferably be achieved by the generator (G) providing a preliminary mask image and applying the sigmoid function to the preliminary mask image to obtain a mask image (M) with values in the range from 0 to 1.

The mask image (M) is then inverted by an inversion unit (Inv) in order to obtain an inverted mask image ($M^{-1}$). Then the Hadamard product between the intermediate image and the mask image (M) is provided as first result image ($R_1$). The Hadamard product between the input image (I) and the inverted mask image ($M^{-1}$) is provided as second result image ($R_2$). The sum of the first result image ($R_1$) and the second result image ($R_2$) is then provided as output image (O).

In further embodiments (not shown), it can be envisioned that the set (T) is not used for training the classifier (60) but for testing it. For example, it can be envisioned that the classifier (60) is supposed to be used in a safety critical product such as an autonomous vehicle (10). It can be further envisioned, that the classifier (60) needs to achieve a predefined classification performance before being cleared to be used in the product.

The classification performance can be assessed by determining the classification performance of the classifier (60) on a test dataset, wherein the test dataset was provided using the steps one (901) to four (904) as described above.

The clearance of the classifier (60) may, for example, happen in an iterative fashion: As long as the classifier (60) does not satisfy the predefined classification performance, it can be further trained on new training data, and then tested again on the provided test dataset.

What is claimed is:

1. A computer-implemented method for training a classifier, the classifier being a machine-learning model configured to provide a classifier output signal characterizing a classification of a first input signal, the classifier being trained based on a training dataset, the computer-implemented method comprising:
    generating a training output signal with features of a second class based on a second input signal with features of a first class using a first generator, or generating a mask signal indicating which parts of the second input signal show the features of the first class using the first generator;
    generating the training output signal or the mask signal based on the second input signal using the first generator;
    generating a difference signal corresponding to the second input signal, the difference signal based on a difference between the second input signal and the training output signal, or the difference signal is the mask signal; and
    generating a desired output signal corresponding to the second input signal based on the difference signal, the desired output signal characterizing a desired classification of the second input signal,
    wherein the training dataset includes the second input signal and the desired output signal.

2. The computer-implemented method according to claim 1, wherein:
    generating the training output signal comprises training a CycleGAN,
    the CycleGAN comprises a second generator and a third generator, and
    training the CycleGAN comprises training the second generator to provide a generator output signal with features of the second class based on a provided input signal with features of the first class, and training the third generator to provide an input signal with features of the first class based on the generator output signal with features of the second class, and providing the second generator as the first generator after training of the CycleGAN.

3. The computer-implemented method according to claim 2, wherein providing the generator output signal with features of the second class based on the provided second input signal with features of the first class using the first generator or the second generator comprises:
    generating an intermediate output signal and the mask signal based on the second input signal;
    determining a first Hadamard product between the mask signal and the intermediate output signal;
    generating a first result signal based on the determined first Hadamard product;
    determining a second Hadamard product between an inverse of the mask signal with the second input signal;
    generating a second result signal based on the determined second Hadamard product; and
    generating the generator output signal based on a sum of the first result signal and the second result signal.

4. The computer-implemented method according to claim 3, further comprising:
    training the second generator using a loss function that depends on a sum of absolute values of sub-elements of the mask signal.

5. The computer-implemented method according to claim 1, wherein generating the desired output signal comprises:
    determining a norm value for a sub-element of the difference signal, the norm value corresponding to the sub-element; and
    comparing the norm value with a predefined threshold value.

6. The computer-implemented method according to claim 5, wherein the desired output signal comprises:
    at least one bounding box generated by determining a region in the difference signal comprising a plurality of the sub-elements,
    wherein the plurality of the sub-elements comprises sub-elements whose corresponding norm values do not fall below the predefined threshold value, and
    wherein the region is the at least one bounding box.

7. The computer-implemented method according to claim 5, wherein:
    the desired output signal comprises a semantic segmentation signal of the second input signal, generating the semantic segmentation signal comprises:
  generating a signal of a same height and width as the difference signal;
  determining a norm value of a sub-element in the difference signal, the sub-element having a position in the difference signal;
  setting a sub-element at the position in the difference signal to belong to the first class when the determined norm value falls below a predefined threshold and setting the sub-element to a background class otherwise; and
  the signal is the semantic segmentation signal.

8. A computer-implemented method for obtaining a classifier output signal characterizing a classification of a first input signal, the computer-implemented method comprising:
  training a classifier, the classifier being a machine-learning model configured to provide the classifier output signal characterizing the classification of the first input signal, the classifier being trained based on a training dataset, the training the classifier comprising:
    generating a training output signal with features of a second class based on a second input signal with features of a first class using a first generator, or generating a mask signal indicating which parts of the second input signal show the features of the first class using the first generator;
    generating the training output signal or the mask signal based on the second input signal using the first generator;
    generating a difference signal corresponding to the second input signal, the difference signal based on a difference between the second input signal and the training output signal, or the difference signal is the mask signal; and
    generating a desired output signal corresponding to the second input signal based on the difference signal, the desired output signal characterizing a desired classification of the second input signal, wherein the training dataset includes the second input signal and the desired output signal;
  supplying the trained classifier to a control system having at least one processor; and
  obtaining the classifier output signal from the control system,
  wherein the control system provides the first input signal to the classifier to obtain the classifier output signal.

9. The computer-implemented method according to claim 8, further comprising:
  controlling an obtaining of the first input signal based on a signal of a sensor and/or an actuator based on the classifier output signal; and/or
  controlling a display device based on the classifier output signal.

10. A computer-implemented method for determining whether a classifier can be used in a control system, the control system having at least one processor, the classifier being a machine-learning model, the computer-implemented method comprising:
  determining that the classifier can be used in the control system if and only if its classification performance on a test dataset indicates an acceptable accuracy with respect to a threshold; and
  wherein generating the test dataset comprises:
    generating a training output signal with features of a second class based on a second input signal with features of a first class using a first generator, or generating a mask signal indicating which parts of the second input signal show the features of the first class using the first generator;
    generating the training output signal or the mask signal based on the second input signal using the first generator;
    generating a difference signal corresponding to the second input signal, the difference signal based on a difference between the second input signal and the training output signal, or the difference signal is the mask signal; and
    generating a desired output signal corresponding to the second input signal based on the difference signal, the desired output signal characterizing a desired classification of the second input signal,
  wherein the test dataset includes the second input signal and the desired output signal.

11. The computer-implemented method according to claim 10, wherein a computer program is configured to cause a computer to carry out the computer-implemented method when the computer program is carried out by a processor.

12. The computer-implemented method according to claim 11, wherein the computer program is stored on a non-transitory machine-readable storage medium.

13. The computer-implemented method according to claim 1, wherein a control system having at least one processor is configured to control an actuator and/or a display device based on the classifier output signal of the trained classifier.

14. The computer-implemented method according to claim 1, wherein a training system having at least one processor is configured to carry out the computer-implemented method.

* * * * *